Jan. 18, 1966   W. J. CONOVER   3,229,663
FARM ANIMAL FEEDING HOUSE
Filed Jan. 7, 1964   3 Sheets-Sheet 1

INVENTOR
WILLIAM J. CONOVER
BY
Robert Henderson
ATTORNEY

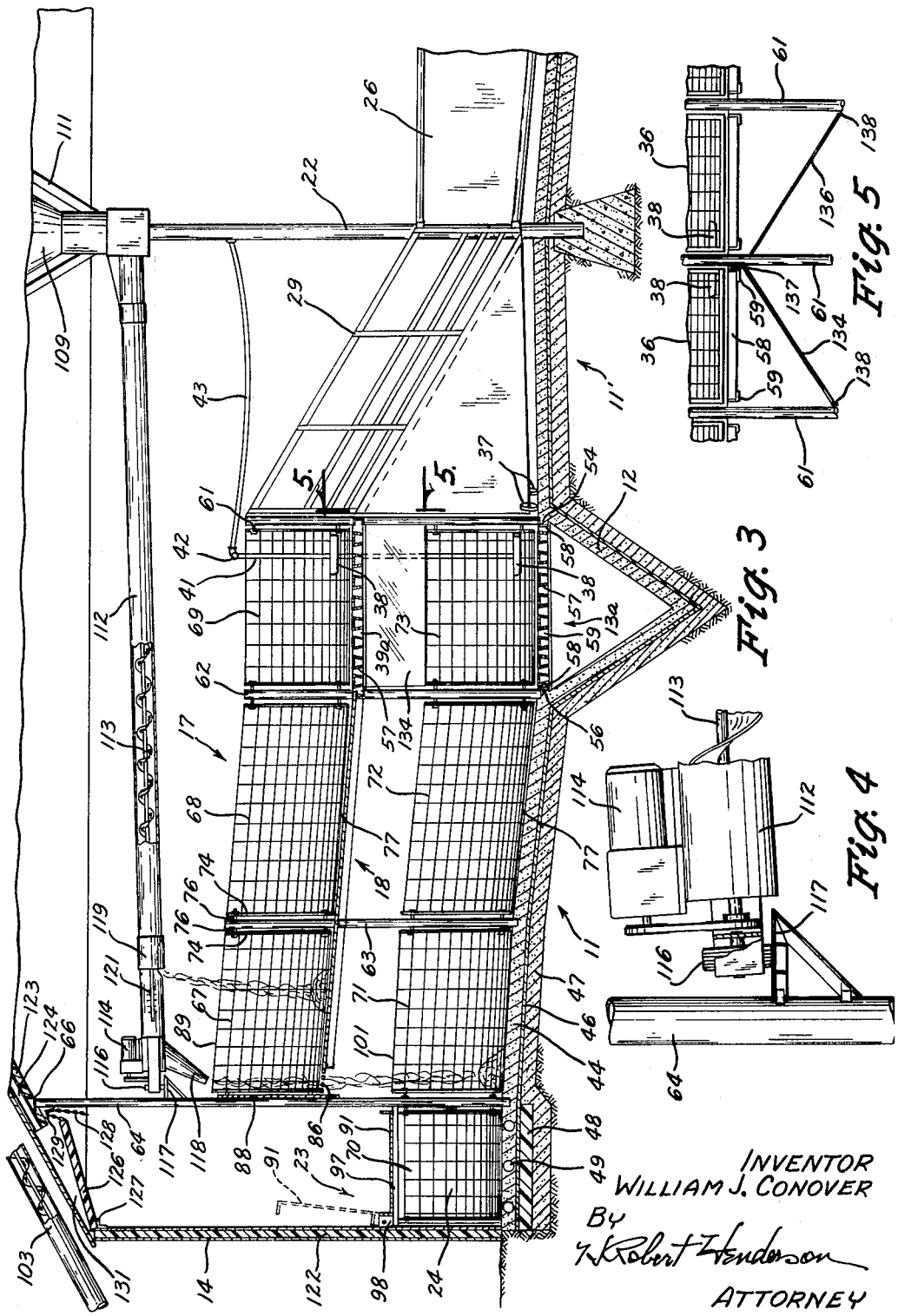

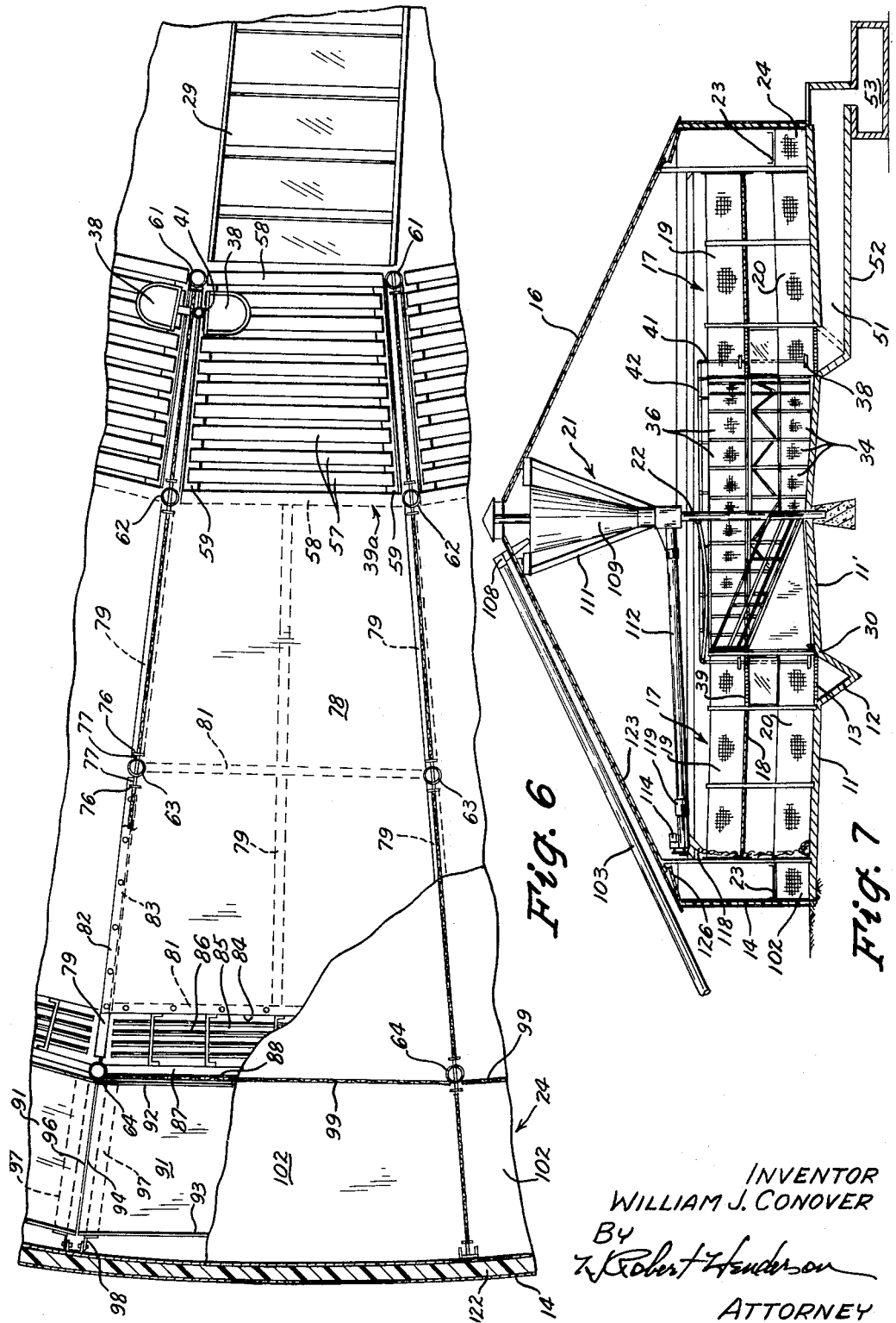

United States Patent Office 3,229,663
Patented Jan. 18, 1966

3,229,663
FARM ANIMAL FEEDING HOUSE
William J. Conover, Rhodes, Iowa, assignor to Black, Sivalls & Bryson, Inc. (B.S. & B.), Kansas City, Mo., a corporation of Delaware
Filed Jan. 7, 1964, Ser. No. 336,227
13 Claims. (Cl. 119—16)

This application is a continuation-in-part of my co-pending application, Ser. No. 262,472 filed March 4, 1963, entitled, "Farrowing Layout," now U.S. Patent No. 3,148,663, issued September 15, 1964.

This invention relates generally to new and useful improvements in raising livestock, and pertains particularly to a farrowing unit in the form of a farm animal feeding house.

It is an object of this invention to provide an improved farm animal feeding house.

It is another object of this invention to provide a multi-story farm animal feeding house.

It is yet another object of this invention to provide a circular farrowing unit wherein a series of individual stalls are formed on at least two vertically spaced floors, each stall capable of confining a sow and subsequently her offspring, and whereby feed and water are supplied to each stall, and the offal disposed from each stall with the least amount of effort by the operator.

Still another object of this invention is to arrange the stalls on both floors of a multi-story farrowing house in a circular manner to use a minimum of floor space while providing the basis for a most efficient feeding and waste removal system for the stalls, wherein feed can be discharged above the upper, second floor and supply both floors simultaneously, and further wherein offal from the upper floor drops through both floors to a common sanitation trough for removal.

Yet another object of this invention is to provide a plurality of two-story high partitions forming a plurality of radial, arcuately spaced pie-shaped individual sow and litter stalls above and below each other on downwardly sloping floors arranged within a circular enclosure, whereby an operator may view the animals on both floors without changing position, and whereby stalls on both floors can be serviced as to feeding, watering, and waste disposal without undue duplicity of equipment.

It is a further object of this invention to provide a farrowing and feeding unit as mentioned hereinbefore wherein a cat walk provided for the operator about and intermediate a pair of floors, each having individual stalls thereon, also serves to provide an area on the first floor within each stall whereat the offspring can be separated from the sow for safety purposes.

It is another object of this invention to divide a circular enclosure into a plurality of radial, arcuately spaced stalls on at least two floors by a novel partition arrangement, wherein a central service area is provided, and with a number of service area segmentizing gates movably mounted within said service area; one of said gates being a ramp for moving the sows and pigs from one floor to another and into predetermined stalls.

Still another object of this invention is to provide a farm animal feeding house capable of attaining all of the objectives enumerated hereinbefore which is economical to manufacture, easy to install, and effective in operation.

It is an object of this invention to provide an improved feed material handling method for discharging the material in a circular path.

It is another object of this invention to provide a novel combination of elements making up an improved circular structural arrangement for the handling and discharging of a feed material.

These objects, and other features and advantages of this invention will become readily apparent upon reference to the following description when taken in conjunction with the accompanying drawings, wherein:

FIG. 3 is an enlarged vertical sectional view taken along the offset line 3—3 in FIG. 2;

FIG. 4 is an enlarged view of the motorized end of the auger feed conveyor of FIG. 3;

FIG. 5 is an enlarged fragmentary sectional view taken along the line 5—5 in FIG. 4, and showing a pair of offal deflecting shields below the second floor;

FIG. 6 is an enlarged fragmentary plan view of a second floor stall, with the stall partially broken away to show a portion of the first floor stall therebelow; and FIG. 7 is a reduced sectional view showing the feeding house of this invention in elevation as seen substantially along a line across the diameter of the circular house.

Figure 1:
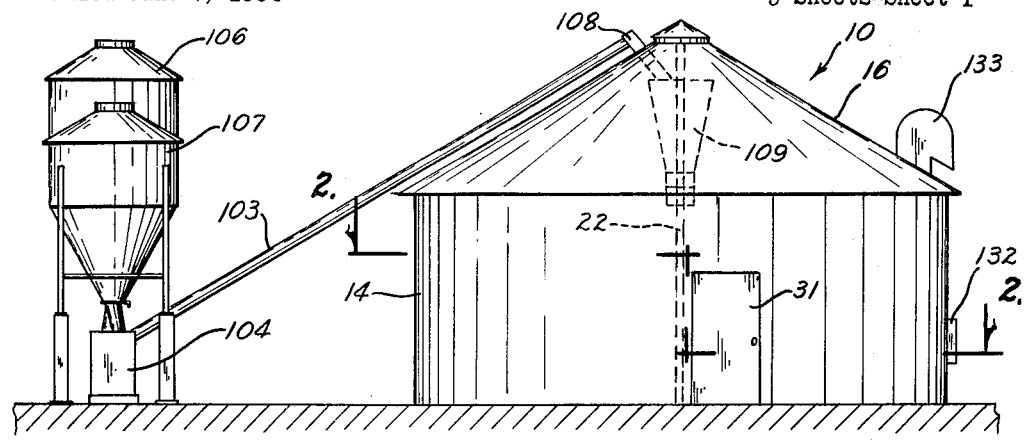
FIG. 1 is an elevational view of the circular feeding house of this invention in assembled relation with a pair of bulk tanks.

Referring to the drawings, the farm animal feeding house of this invention is indicated generally at 10 in FIG. 1 and comprises basically a circular first floor 11 (FIG. 7) having an annular sanitation trough 12 formed therein which is covered by a grate 13. An upstanding circular wall 14 of corrugated sheet steel or the like is mounted on the periphery of the floor 11, and a conical roof 16 is supported on the wall 14 for enclosing the feeding house 10.

Within the feeding house 10, a plurality of radial, arcuately spaced multi-story partitions, indicated generally in FIG. 3 at 17, form a plurality of radial, pie-shaped stalls for the farm animals. The stalls are divided by a second floor indicated generally at 18 in FIG. 3 whereby a plurality of upper stalls 19, 19a, 19b, 19c (FIGS. 2 and 7), etc., are formed as are a plurality of lower stalls 20, 20a, 20b, 20c, etc. The second floor 18 is spaced sufficiently above the first floor 11 so that the sows and their offspring can easily maneuver between the two floors. Furthermore, the second floor 18 is spaced sufficiently below the upper edges of the partitions 17 so that the depth of the second floor stalls 19 safely confine the sows therein.

Both floors 11 and 18 are provided with feed in a manner described in detail hereinafter by feed equipment indicated generally at 21 in FIG. 7, which equipment is mounted on and rotates about a center post 22 for the feeding house 10. To enable the operator to view both floors 11 and 18 simultaneously without changing his location, a cat walk assembly 23 (FIG. 7) is provided which cooperates with the circular wall 14 and partitions 17 to also cover a confinable area 24 (FIG. 3) therebelow for separating the offspring from the sows if necessary for safety purposes.

Figure 2:
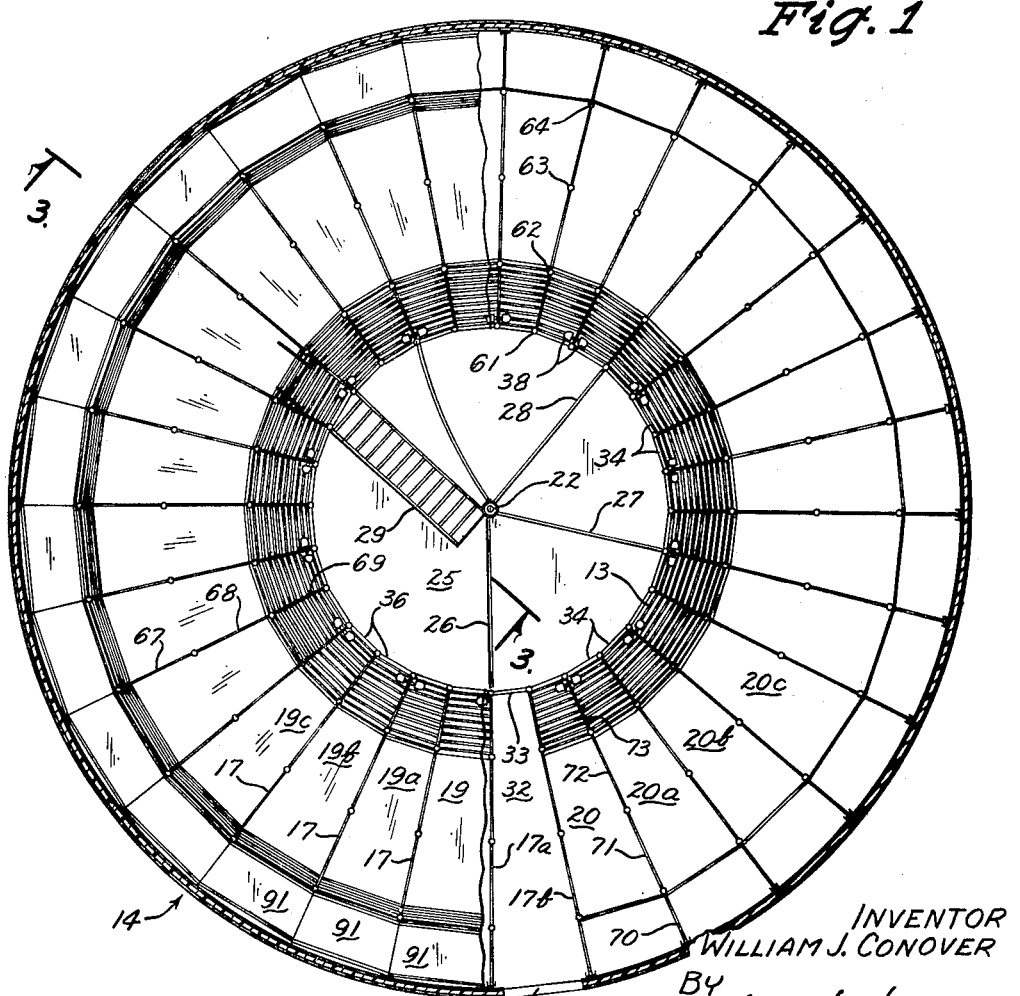
FIG. 2 is an enlarged sectional view taken along the offset line 2—2 in FIG. 1 to show in fragmentary form both floors in plan view.

Referring to FIGS. 2 and 7, it is seen that the inner ends of the partitions and stalls form a line concentric with the floor 11 on the inner edge 30 of the trough 12, and form thereby a center service area 25 within which a plurality of radial gates 26, 27, 28, and 29 are mounted. Both the operator and the sows may enter the feeding house 10 through a door opening 31 in the wall 14, and through a passage 32 (FIG. 2) formed between a pair of partitions 17a and 17b. Upon opening a gate 33, the center service area 25 is thus accessible. Each lower stall 20, etc., is provided also with a swingable gate 34 (FIG. 7) for ingress and egress, with each upper stall 19, etc., having like gates 36 (FIGS. 2 and 7). As seen in FIG. 2, the gates 26–29, which swing about the center post 22 to positions contiguous with the lower gates 34, readily segment or compartmentize the service area 25 for maneuvering the animals as desired. One of the gates 29 is a ramp for providing an inclined structure to move the animals from the first floor 11 to the inner end of any second floor stall 19 etc. The ramp gate 29 is also rotatably secured to the center post 22 and is mounted on wheels 37 (FIG. 3) for rolling about the floor 11.

For the purpose of providing a continuous flow of water to each upper and lower stall, an automatic watering device 38 (FIG. 6) is mounted within each stall adjacent the inner end thereof, it being noted that each watering device 38 is directly over a first floor grate 13 and a similar grate 39 (FIGS. 3 and 6) for the second floor 18. The devices 38 are mounted in pairs (see FIG. 6), each pair leading off a vertical pipe 41 affixed to one side of a partition, and with all water pipes 41 connected at their upper ends to an overhead pipe 42. The pipe 42 is supplied water by a flexible conduit 43 (FIG. 3) emerging from the center post 22. As the devices 38 supply water automatically upon demand by any animal, the watering system is entirely automatic, requiring but the usual service and maintenance from the operator.

The first floor 11 is shown in detail in FIG. 3 and comprises a layer of concrete 44 above a sheet 46 of polyethelene or the like above a layer of gravel 47 on top of the soil. At the outer peripheral edge, a slab of styrofoam 48 or the like is inserted beneath the sheet 46, and note a plurality of heating pipes 49 embedded in the concrete. The first floor 11 slopes downwardly, as best indicated in FIGS. 3 and 7, from its periphery to the trough 12, and then has a gradual upward incline at the central section 11' until it reaches an apex at the center post 22.

The sanitation trough 12, best illustrated in FIGS. 3 and 7, has a V-shaped formation, is of a cross-section similar to the remainder of the floor 11, and extends in an annular direction concentric with the center of the floor 11. A disposal trench 51 with a downwardly sloping bottom 52 leads off from the trough 12 beneath the floor 11 for depositing the offal and other wastes within a septic tank 53 or the like. Square shoulders 54 and 56 (FIG. 3) are provided about the upper, inner and outer edges of the trough to provide support completely around the trough for the first floor grate 13.

Both the first floor grate 13 and the second floor grate 39 (FIG. 3) are substantially identical, each comprising a series of sections of grating, each section 13a (FIG. 3) and 39a (FIG. 6) for example comprising the floor for a stall at its inner end. Each first floor grate section 13a (FIG. 3) includes a plurality of inverted U-shaped slabs 57 laid in parallel, radial spaced arrangement whereby animal and other waste pass inbetween the slabs 57. The lengths of the slabs 57 gradually decrease to accommodate the pie-shape of the stalls. Angle irons 58 are provided at the inner and outer ends of the grate section 13a for support on the concrete shoulders 54 and 56, and the ends of the slabs 57 and the angle irons 58 are all secured as by welding to another pair of angle irons 59 (FIG. 3, only one showing).

The second floor grate section 39a (FIGS. 3 and 6) also has a plurality of slabs 57 secured in a parallel, radially spaced arrangement and with their ends secured to a pair of angle irons 59. These angle irons 59 are secured to the pair of angle irons 58 secured in turn to pairs of posts 61, 62 (FIG. 6) in adjacent rows of posts for the partitions 17.

Each partition 17 (FIGS. 3 and 6), in addition to the radially spaced posts 61 and 62, includes another pair of radially spaced posts 63 and 64, all posts substantially equally spaced and on one radius. The innermost post 61 is mounted on the first floor 11 just inside the trough 12, with the next post 62 mounted just outside the trough 12. Posts 61–63 are of substantially identical height with the outer post 64 extended upwardly to engage and support a portion 66 of the roof 16 (FIG. 3).

The partition 17 also includes a plurality of fence sections 67, 68, 69, 70, 71, 72, and 73. All fence sections are substantially identical, each having end members 74 adapted for securement to bolts 76 secured to the posts. Referring to FIG. 3, it is noted that the fence section 70 is secured at its outer end to the wall 14. In each instance, a fence section is mounted with its lower edge 77 just above the surface of the floor to prevent the offspring from moving from one stall to another. Needless to say, this safety and confining feature is maintained throughout the feeding house 10.

Referring to FIG. 2, it is seen that by arcuately and equally spacing each row of posts and fence sections which combine to form the stalls extended inwardly from the wall 14 and ending at a location radially spaced from the center post, all of the stalls are pie-shaped, radially extending and arcuately contiguous, cooperating with the wall 14 and the first floor 11 to provide a utilization of space of the highest degree. This utilization of space is even more enhanced by the provision of the second floor 18 (FIG. 3) substantially complementary to the first floor 11 and bisecting the partitions 17 to provide the upper and lower stalls, 19 etc. and 20 etc., respectively.

Specifically, the second floor 18 is divided into sections one for each stall, and which include in addition to the second floor grate 39 (FIG. 6) a pie-shaped panel 78 adapted to be bolted to a plurality of radial and arcuate angle irons 79 and 81 secured to and extended between the three pairs of posts 62–64 each. Radial edges 82 and 83 of adjacent panels overlap for bolting purposes, and it will be noted that the outer edge 84 of the panel is spaced radially inwardly from the outer posts 64 to leave an opening in the second floor 18 at the rear end of each upper stall 19 etc.

This opening 85, for feeding purposes as seen hereinafter, is filled with a grate 86 bolted to an angle iron 81 and to another angle iron 87 secured to the posts 64. The grate 86 fills the feed opening 85 sufficiently to prevent an animal from falling therethrough, but also leaves sufficient space to permit granular feed to pass therethrough from above the second floor 18. To ensure that the feed discharged from the feed equipment 21 above the second floor does pass downwardly through the grate 86, a panel 88 (FIGS. 3 and 6) is secured in an upstanding manner between the posts 64, and which extends from substantially the top edge 89 of the fence section 67 downwardly slightly below the grade 86 (see FIG. 3). Thus, the panel 88 acts to deflect and direct granular material downwardly through the grate 86 for a purpose described hereinafter.

Beyond the panel 88, a plurality of which act to form a complete circular-type enclosure about the outer ends of the upper stalls 19 etc., is the cat walk assembly 23 mentioned hereinbefore. Similar to the other stall elements which combine to form an entire individual stall capable of confining a sow and subsequently her offspring, the cat walk assembly 23 is made up of a plurality of U-shaped floor sections 91 (FIGS. 2 and 3). Each floor section 91 is trapezoidal in that the inner and outer edges 92 and 93, respectively (see FIG. 6) are parallel and tangential to a radius of the house 10, and with the end edges 94 and 96 radially extended.

A radially extended angle iron 97 is secured at opposite ends to the wall 14 and to the outer post 64 to provide support for adjacent ends of adjacent floor sections 91. The two outer corners of each cat walk floor section 91 are secured to a bracket unit 98 affixed to the wall 14 which enables each floor section 91 to be pivoted at the bracket units 98. Thus, as best seen in FIG. 3, each floor section 91 is movable from a generally horizontal position wherein the edges are extended over the outer fence sections 70 of a pair of adjacent partitions 17, to a raised position as indicated by dotted lines in FIG. 3.

Cooperable with each cat walk floor section 91 is an individual, relatively flat fence section 99 (FIG. 6) having a width enabling it to be shoved downwardly between a pair of adjacent posts 64, and within a space defined between the floor section inner edge 92 and the angle iron 87. The fence section 99 has a height whereby it can extend from the surface of the floor 11 to the top edge 101 of the first floor portion fence sections 71. The provision of the adjustably raisable fence section 99 cooperates with a pair of partition fence sections 70, the wall 14, and a cat walk floor section 91 to form an enclosure 102 (FIG. 7) for the offspring at the outer end of each lower stall 20 etc. Thus the section 99 can be raised to permit the offspring to pass back and forth from the enclosure 102 into the remainder of the lower stall. This enclosure 102 can of course be provided with an overhead lamp (not shown) for heat purposes and is directly over the heat pipes 49 (FIG. 3).

Feed is supplied to the feed equipment 21 from external the feeding house 10 by an auger system 103 (FIG. 1) leading from a mix-mill housing 104, beneath a pair of bulk feed tanks 106 and 107, upwardly over the roof line for discharge through a spout 108 into a funnel-type hopper unit 109 (FIG. 7). The hopper unit 109 is mounted on the center post 22, as is an umbrella structure 111 used in supporting the roof as illustrated in FIG. 7, and supplies feed to a downwardly inclined auger feed conveyor 112 rotatably mounted at its inner end to the lower end of the hopper unit 109.

The auger 113 (FIGS. 3 and 4) is rotated by a motor 114 mounted on the outer end of the conveyor 112, via a pulley belt system. A reversible motor (not shown) is also mounted adjacent the motor 114 for rotating a wheel 116 (FIG. 4), affixed to the end of the conveyor 112, in opposite directions. As the wheel 116 rotates against a track 117, a friction drive is obtained upon rotating the wheel 116 for rotating the conveyor 112 about the center post 22. Referring to FIGS. 3 and 7, it is seen that the radial length of the conveyor 112 is such that it extends completely over all the upper and lower stalls 19 and 20.

A spout 118 is provided at the outer end of the conveyor 112 for discharging feed downwardly toward the second floor feed opening grate 86. As seen in FIG. 3, this feed passes on through the grate 86 and is deposited on the floor 11. To supply feed to the second floor 18, the conveyor 112 is provided with a slidable discharge unit 119 mounted inwardly of the spout 118 and controlled by a lever 121 adapted to be reached by the operator while on the cat walk assembly 23. The arrangement is such that manipulation of the lever 121 can selectively regulate both flows of feed through the spout 118 and the discharge unit 119 as to quantity. Thus, selective and concurrent supplying of feed to both floors is provided by the feed equipment. It is furthermore envisioned that the motors can be so controlled that automatic feeding of selected stalls can be obtained.

Referring primarily to FIG. 3, the circular wall 14 of the feeding house 10 is preferred of a double thickness construction with slabs of styrofoam 122 or the like therebetween for insulation purposes. Styrofoam 123 is also affixed to the underside of the roof 16, beneath a plurality of channels 124 whereby to form an air space, with a sky-light unit arranged around the periphery of the roof. This consists of a plurality of slabs 126 of styrofoam hingedly connected to an angle iron 127 or the like at the top of the wall 14, and adjustably connected as by a chain 128 to an element 129 affixed to the outer ends of the channels 124.

For providing fresh air to the interior of the feeding house 10, one or more air inlet scoops 133 (FIG. 1) are mounted on the roof 16. Air entering through the scoops 133, is directed between the roof 16 and the styrofoam 123 downwardly toward a plurality of chambers 131 formed by the sky-light unit described hereinbefore. Thus, the amount of air entering the house 10 can be seasonably controlled, by pulling up or letting down the slabs 126. When the slabs are pulled completely up against the roof 16, the air chambers 131 are closed for all practical purposes against the passage of fresh air therethrough and into the house 10. One or more exhaust fan housings 132 (FIG. 1) are secured in the wall 14 for exhausting air from the feeding house 10. The operation of these fan housings 132 may either be manual or automatic as desired.

In summation, a farm animal feeding house has been described and disclosed herein which is believed a most economical and advantageous feeding house for the farrowing and finishing of sows and their offspring. By providing a basic circular arrangement, by dividing the circular arrangement into radial stalls, by dividing the radial stalls into upper and lower individual stalls, the resulting stalls cooperate with radial feeding and disposal systems to combine into a most practical and efficient feeding house.

Although a preferred embodiment has been disclosed herein, modifications and alternate constructions are envisioned. For example, as best seen in FIGS. 3 and 5, a pair of animal waste deflector panels 134 and 136 are illustrated in assembled relation between an adjacent pair of second floor grates 39. Each panel has an upright flange 137 secured to one of the side angle irons 59 intermediate two stalls; the panels then diverge each toward an opposite side of one of the stalls where their lower edges 138 are removably secured. Thus, animal waste which falls through either upper grate 39 does not fall straight down into the stall there below, but is deflected to one side of each stall, the waste thus falling through the lower grate 13 closely adjacent a partition fence section 73.

It is therefore to be remembered that modifications can be made without departing from the true spirit and scope of the invention as defined in the appended claims.

I claim:

1. A farm animal feeding house comprising in combination:
   a circular first floor sloped from the periphery toward the center thereof;
   said first floor having an annular sanitation trough formed therein, said trough spaced radially from the center of the first floor;
   a grate supported on said first floor and over said trough;
   an upstanding wall formed about the periphery of said first floor and having an opening formed therein for entering and leaving the house;
   a roof mounted on said wall;
   a plurality of partitions supported on said first floor and forming a plurality of stalls; and
   means secured to said partitions and forming a second story floor above said first floor, said partitions also forming a plurality of stalls above said second story floor.

2. A farm animal feeding house comprising in combination:
   a circular first floor sloped from the periphery toward the center thereof;
   said first floor having an annular sanitation trough formed therein, said trough spaced radially from the center of the first floor;
   a grate supported on said first floor and over said trough;
   an upstanding wall formed about the periphery of said first floor and having an opening formed therein for entering and leaving the house;
   a roof mounted on said wall;
   a plurality of radially extended, arcuately spaced partitions supported on said first floor and forming a plurality of stalls, the inner end of each stall extended over a portion of said grate;
   means secured to said partitions and forming a second story floor above said first floor and cooperating with said partitions to form a plurality of stalls above said second story floor;
said second story floor having an opening formed therein above said grate, and another grate supported on said second story floor over said opening; and
means secured to said posts for enclosing the inner ends of said stalls.

3. A farm animal feeding house comprising in combination:
a circular first floor sloped from the periphery toward the center thereof;
said first floor having an annular sanitation trough formed therein, said trough spaced radially from the center of the first floor;
a grate supported on said first floor and over said trough;
an upstanding wall formed about the periphery of said first floor and having an opening formed therein for entering and leaving the house;
a roof mounted on said wall;
a plurality of arcuately spaced rows of radially spaced posts mounted on said first floor;
a plurality of partitions secured to and extended radially between said posts and forming a plurality of pie-shaped stalls on said first floor;
means secured to said posts and extended substantially complementary to said first floor and forming a second floor spaced sufficiently above said first floor to enable farm animals to walk therebetween;
another plurality of said partitions secured to and extended radially between said posts and forming a plurality of pie-shaped stalls on said second floor; and
means secured to said posts for enclosing the inner ends of said stalls.

4. A farm animal feeding house comprising in combination:
a circular first floor sloped downwardly from the periphery toward the center thereof;
said first floor having an annular sanitation trough formed therein, said trough spaced radially from the center of the first floor;
a grate supported on said first floor and over said trough;
an upstanding wall formed about the periphery of said first floor and having an opening formed therein;
a roof mounted on said wall;
a plurality of arcuately spaced rows of radially spaced posts mounted on said first floor;
a plurality of partitions secured to and extended radially between said posts and forming a plurality of pie-shaped stalls on said first floor, the inner end of each stall extended over a portion of said grate;
means secured to said posts and forming a second floor spaced sufficiently above said first floor to enable farm animals to walk therebetween, said second floor having an opening formed therein above said grate;
another plurality of said partitions secured to and extended radially between said posts and forming a plurality of pie-shaped stalls on said second floor;
another grate supported on said second floor and extended over said opening formed therein, whereby said grates are above and below each other; and
means secured to said posts for enclosing the inner ends of said stalls.

5. A farm animal feeding house comprising in combination:
a circular first floor sloped downwardly from the periphery toward the center thereof;
said first floor having an annular sanitation trough formed therein, said trough spaced radially from the center of the first floor;
a grate supported on said first floor and over said trough;
an upstanding wall formed about the periphery of said first floor and having an opening formed therein for entering and leaving the house;
a roof mounted on said wall;
a plurality of arcuately spaced rows of radially spaced posts mounted on said first floor;
a plurality of partitions secured to and extended radially between said posts and forming a plurality of pie-shaped stalls on said first floor;
means secured to said wall and operatively secured to certain of said posts forming a cat walk spaced above said first floor and over the outer ends of said partitions;
means secured to said posts inwardly of said certain posts and forming a second floor spaced sufficiently above said first floor to enable farm animals to walk therebetween;
another plurality of said partitions secured to and extended radially between said posts inwardly of said certain posts and forming a plurality of pie-shaped stalls on said second floor; and
means secured to said posts for enclosing the inner ends of said stalls.

6. A farm animal feeding house as defined in claim 5, further wherein said cat walk means comprises a plurality of arcuately contiguous sections, each section pivotally attached to said wall and rotatable between a generally horizontal position and a generally vertical position, each section extended between adjacent partitions whereby to normally cover the outer end of a stall.

7. A farm animal feeding house as defined in claim 6, and further wherein a gate is movable from a raised position above said first floor, to a lowered position against said first floor and contiguous with the inner side of a cat walk section, said gate dividing a stall on said first floor into a pair of radially spaced substalls.

8. A farm animal feeding house comprising in combination:
a circular first floor;
a circular enclosure mounted on said first floor;
partition means forming a plurality of radial extended, arcuately spaced stalls on said first floor;
means connected to said partition means and forming a second floor above said first floor and with said partition means also forming a plurality of said stalls above said second floor; and
said second floor having a perforated section formed about the periphery thereof to receive feed placed thereon, whereby feed discharged from above said second floor passes through said perforated section and toward said first floor.

9. A farm animal feeding house as defined in claim 8 and further wherein deflection means is mounted about said periphery on the outer side of said section for directing the feed through the opening.

10. A farm animal feeding house as defined in claim 9, and further wherein feed discharge means is mounted within said enclosure for rotation about the center thereof above said second floor, said feed discharge means selectively and concurrently operable to discharge feed toward said perforated section and toward an area of said second floor spaced radially inwardly thereof.

11. A farm animal feeding house comprising in combination:
a circular first floor;
said first floor having an annular sanitation trough formed therein, said trough concentric with said first floor;
a grate supported on said first floor and over said trough;
an upstanding, circular wall extended about the periphery of said first floor and having an opening formed therein;
a roof mounted on said wall and extended over said first floor;

a plurality of partitions supported on said first floor and forming a plurality of arcuately spaced stalls the inner ends of which extend over said grate;

means secured to said partitions and forming a second floor above said first floor, said partitions also forming a plurality of stalls above said first floor;

said second floor within each stall having a first opening formed therein at an inner end of a stall above said grate, and having a second opening formed therein at an outer end of a stall above an outer end of a stall on said first floor;

a pair of grates mounted over said first and second openings;

means for discharging feed rotatably mounted within said house above said second floor and operable to selectively and concurrently discharge feed upon said second floor, inwardly of said second opening grate, and also through said second opening grate and upon said first floor; and means secured to said partitions for enclosing the inner ends of said stalls.

12. A farm animal feeding house as defined in claim 11, and further wherein means is secured below said second floor first opening grate at an inner end of each stall for deflecting animal offal toward a partition.

13. A farm animal feeding house comprising in combination:

an annular sanitation trough formed in the ground;

a floor formed over the ground and sloped downwardly from its periphery toward the center thereof, with the floor perforated above said trough;

means forming a plurality of stalls in a side-by-side relation about said floor center with the inner ends of said stalls spaced radially from and arranged concentrically about said floor center;

means forming a second floor above said first floor and cooperating with said partitions to divide said stalls into first floor and second floor stalls;

swingable means for normally closing the inner ends of said stalls; and a plurality of radially extended gates secured at one end at said floor center and contiguous with said stall inner ends, one of said gates comprising a ramp sloped from the level of said second floor to said first floor.

References Cited by the Examiner
UNITED STATES PATENTS

| | | | |
|---|---|---|---|
| 3,011,658 | 12/1961 | Peterson | 214—10 |
| 3,049,244 | 8/1962 | Hansen | 214—10 |
| 3,137,270 | 6/1964 | Rigterink et al. | 119—16 |
| 3,148,663 | 9/1964 | Conover | 119—16 |

SAMUEL KOREN, *Primary Examiner.*

ALDRICH F. MEDBERY, *Examiner.*